United States Patent
Morishita et al.

(10) Patent No.: US 10,086,677 B2
(45) Date of Patent: Oct. 2, 2018

(54) VEHICLE AIR CONDITIONING DEVICE, ELECTRIC COMPRESSOR, AND VEHICLE AIR CONDITIONING METHOD

(71) Applicant: MITSUBISHI HEAVY INDUSTRIES AUTOMOTIVE THERMAL SYSTEMS CO., LTD., Kiyosu-shi, Aichi (JP)

(72) Inventors: Masatoshi Morishita, Tokyo (JP); Koji Nakano, Tokyo (JP); Hideo Nakamura, Tokyo (JP); Keiji Nagasaka, Tokyo (JP); Shunsuke Yakushiji, Tokyo (JP)

(73) Assignee: MITSUBISHI HEAVY INDUSTRIES THERMAL SYSTEMS, LTD., Kiyosu-shi (JP)

( * ) Notice: Subject to any disclaimer, the term of this patent is extended or adjusted under 35 U.S.C. 154(b) by 239 days.

(21) Appl. No.: 14/908,068

(22) PCT Filed: Sep. 24, 2014

(86) PCT No.: PCT/JP2014/075180
§ 371 (c)(1),
(2) Date: Jan. 27, 2016

(87) PCT Pub. No.: WO2015/046194
PCT Pub. Date: Apr. 2, 2015

(65) Prior Publication Data
US 2016/0185184 A1    Jun. 30, 2016

(30) Foreign Application Priority Data
Sep. 30, 2013   (JP) .................................. 2013-204666

(51) Int. Cl.
*F25B 1/00*    (2006.01)
*B60H 1/22*    (2006.01)
(Continued)

(52) U.S. Cl.
CPC ........... *B60H 1/22* (2013.01); *B60H 1/00921* (2013.01); *B60H 1/3222* (2013.01); *F04B 35/04* (2013.01);
(Continued)

(58) Field of Classification Search
CPC ........ B60H 1/22; B60H 1/00921; B60H 1/32; F04B 35/04; F04B 39/06; F04B 49/02
See application file for complete search history.

(56) References Cited

U.S. PATENT DOCUMENTS

| | | | |
|---|---|---|---|
| 6,178,760 B1 * | 1/2001 | Tanaka | B60H 1/00392 62/154 |
| 2009/0092501 A1 | 4/2009 | Seibel | |

(Continued)

FOREIGN PATENT DOCUMENTS

| | | |
|---|---|---|
| CN | 102312829 A | 1/2012 |
| JP | 8-144984 A | 6/1996 |

(Continued)

OTHER PUBLICATIONS

Office Action dated Nov. 28, 2016, issued in counterpart Chinese Patent Application No. 201480042414.9, with English translation. (17 pages).

(Continued)

*Primary Examiner* — Elizabeth Martin
(74) *Attorney, Agent, or Firm* — Westerman, Hattori, Daniels & Adrian, LLP (57) ABSTRACT

A refrigerant heating performance is increased while suppressing an increase in weight or cost. A vehicle air-conditioning device (10) is provided with a heat pump cycle (16) for heating operation in which an electric compressor (50) for compressing refrigerant, a vehicle-cabin-interior condenser (26), a throttle (52), and a vehicle-cabin-exterior heat exchanger (54) are connected in that order via refrigerant (Continued)

piping. An inverter for the electric compressor (50) in which a power element comprising a highly heat-resistant semiconductor device is used is disposed on the electric compressor (50) so that the refrigerant compressed by the electric compressor (50) can be heated by the power element. During heating operation of the heat pump cycle (16), the refrigerant is heated by the power element.

6 Claims, 7 Drawing Sheets

(51) Int. Cl.
    *F04B 35/04*     (2006.01)
    *F04B 39/06*     (2006.01)
    *B60H 1/00*     (2006.01)
    *B60H 1/32*     (2006.01)
(52) U.S. Cl.
    CPC .... *F04B 39/06* (2013.01); *B60H 2001/00949* (2013.01)

(56) References Cited

U.S. PATENT DOCUMENTS

| 2012/0001575 A1 | 1/2012 | Kubo | |
|---|---|---|---|
| 2013/0255298 A1* | 10/2013 | Amano | F25B 29/003 62/186 |

FOREIGN PATENT DOCUMENTS

| JP | 2000-94942 A | 4/2000 |
|---|---|---|
| JP | 2004-61071 A | 2/2004 |
| JP | 3939445 B | 7/2007 |
| JP | 4140562 B | 8/2008 |
| JP | 2009-264206 A | 11/2009 |
| JP | 2012-13040 A | 1/2012 |

OTHER PUBLICATIONS

International Search Report dated Dec. 22, 2014, issued in counterart Application of PCT/JP2014/075180, with English translation (5 pages).

Written Opinion dated Dec. 22, 2014, issued in counterpart Application of PCT/JP2014/075180, with English translation (6 pages).

\* cited by examiner

VEHICLE AIR CONDITIONING DEVICE, ELECTRIC COMPRESSOR, AND VEHICLE AIR CONDITIONING METHOD

TECHNICAL FIELD

The present invention relates to a vehicle air conditioning device, an electric compressor, and a method of air conditioning a vehicle.

BACKGROUND ART

Electric vehicles (EV) cannot utilize engine exhaust heat for heating because they cannot be fitted with an internal combustion engine.

Also, hybrid electric vehicles (HEV), plug-in hybrid electric vehicles (PHEV), and similar hybrid electric vehicles with an engine are controlled to shut off the engine as much as possible for fuel-efficiency. Taking on board these issues, research is being done on heating by heat pump heating systems that use a refrigerant and electric heaters that use coolant as a medium.

The power consumed when heating is extremely large, and so heat pump systems, which have a high coefficient of performance (COP) for heating, have become desirable as a system for heating. The COP of electric heaters, in contrast, does not even reach a value of 1. However, heat pump heating at low outside temperatures (for example, −10° C. or below) may cause moisture in the air to condense and form as frost on the outside heat exchanger, potentially causing a decrease in the heating performance.

When frost forms on a room air conditioning device for household use or the like, the system operates in reverse (switches from heating operation to cooling operation) to remove frost from the outside heat exchanger. However, a similar frost removal operation in a heat pump system for a vehicle would result in the heating operation ceasing.

In order to solve the problem described above, Patent Document 1 has described a heating and cooling device for an automobile comprising a hot water refrigerant heat exchanger disposed on a refrigerant outlet side of an outside heat exchanger (main condenser) that functions as an evaporator. When the outside heat exchanger becomes frosted due to low outside air temperatures, the heating and cooling device for an automobile secures the necessary heating performance by heating the medium, supplementing the insufficient amount of heat taken in at the outside heat exchanger, at the hot water refrigerant heat exchanger and evaporating the medium.

CITATION LIST

Patent Literature

Patent Literature 1: Japanese Patent No. 3939445

SUMMARY OF INVENTION

Technical Problem

However, the heating and cooling device for an automobile described in Patent Document 1 requires, apart from the hot water refrigerant heat exchanger, a hot water tank with a built-in sheathed heater that heats the water, and piping and pumps for supplying the hot water to the hot water refrigerant heat exchanger. Consequently, the heating and cooling device for an automobile described in Patent Document 1 has an increased number of components and an increased weight and cost.

In light of such issues, an object of the present invention is to provide a vehicle air conditioning device, an electric compressor, and a method of air conditioning a vehicle, whereby weight and cost increases are suppressed, and the refrigerant heating performance is increased.

Solution to Problem

In order to solve the above-described problems, a vehicle air conditioning device, an electric compressor, and a method of air conditioning a vehicle according to the present invention employ the following means.

The vehicle air conditioning device according to a first aspect of the present invention comprises: a heat pump cycle for heating in which an electric compressor that compresses a refrigerant, a vehicle-cabin-interior condenser, a throttle, and a vehicle-cabin-exterior heat exchanger are connected in the stated order via refrigerant piping; and an inverter for the electric compressor using a power element constituted by a semiconductor device having high thermal resistance; the inverter being disposed on the electric compressor so that the refrigerant compressed by the electric compressor is able to be heated by the power element, and the power element heating the refrigerant upon heating operation of the heat pump cycle.

The vehicle air conditioning device according to the present embodiment is provided with the heat pump cycle for heating in which the electric compressor that compresses the refrigerant, the vehicle-cabin-interior condenser, the throttle, and the vehicle-cabin-exterior heat exchanger are connected in the stated order via the refrigerant piping.

The electric compressor is controlled by an inverter that uses a power element constituted by a semiconductor device having high thermal resistance. The semiconductor device having high thermal resistance is, for example, a semiconductor device formed from SiC.

Also, the power element is disposed on the electric compressor so that the refrigerant compressed by the electric compressor can be heated by the power element. Specifically, the electric compressor is formed integrally with the inverter.

By the power element being constituted by a semiconductor device having high thermal resistance, the power element can heat the refrigerant with the very heat generated by the semiconductor device having high thermal resistance. Specifically, the present configuration utilizes the power element used in the inverter constituted by a semiconductor device having high thermal resistance as a heat source for heating the refrigerant upon heating operations of the heat pump cycle.

Accordingly, the present configuration whereby weight and cost increases can be suppressed and refrigerant heating performance can be improved is achieved.

The first aspect described above preferably has a configuration further comprising an accumulator connected between the vehicle-cabin-exterior heat exchanger and the electric compressor; and a bypass pipe that connects the vehicle-cabin-exterior heat exchanger and the electric compressor bypassing the accumulator; wherein the refrigerant is supplied to the electric compressor from the vehicle-cabin-exterior heat exchanger via the bypass pipe upon the power element heating the refrigerant.

According to the present configuration, the refrigerant does not go through the accumulator and is supplied to the electric compressor in a state rich in liquid. The refrigerant has a higher heat transfer coefficient in a liquid-rich state than in a gaseous state. As such, a liquid-rich refrigerant can efficiently draw in heat generated by the power element.

The first aspect described above preferably has a configuration wherein, when using the power element to heat the refrigerant, the efficiency of the power element is decreased compared to when the power element is not used to heat the refrigerant.

When the efficiency of the power element decreases, the amount of heat generated by the power element increases. Consequently, the power element can better heat the refrigerant.

The first aspect described above preferably has a configuration wherein the electric compressor is operable on power from a power source outside of the vehicle.

According to the present configuration, the vehicle cabin interior can be heated prior to a person entering the vehicle by operating the heater in advance, thus increasing the comfort level of the person in the vehicle.

The electric compressor according to a second aspect of the present invention is an electric compressor used in a vehicle air conditioning device, the electric compressor comprising an inverter that uses a power element constituted by a semiconductor device having high thermal resistance, the power element being disposed so that a compressed refrigerant is able to be heated thereby.

The method of air conditioning a vehicle according to a third aspect of the present invention is a method of air conditioning a vehicle using a heat pump cycle for heating in which an electric compressor that compressed a refrigerant, a vehicle-cabin-interior condenser, a throttle, and a vehicle-cabin-exterior heat exchanger are connected in the stated order via refrigerant piping, the method comprising the step of heating the refrigerant with a power element constituted by a semiconductor device having high thermal resistance upon heating operation of the heat pump cycle, an inverter for the electric compressor using the power element being disposed on the electric compressor so that the refrigerant compressed by the compressor can be heated by the power element.

Advantageous Effects of Invention

According to the present invention, superior effects of suppressing weight and cost increases and increasing the refrigerant heating performance can be achieved.

DESCRIPTION OF EMBODIMENTS

An embodiment of a vehicle air conditioning device, an electric compressor, and a method of air conditioning a vehicle according to the present invention is described below with reference to the drawings.

Figure 1:
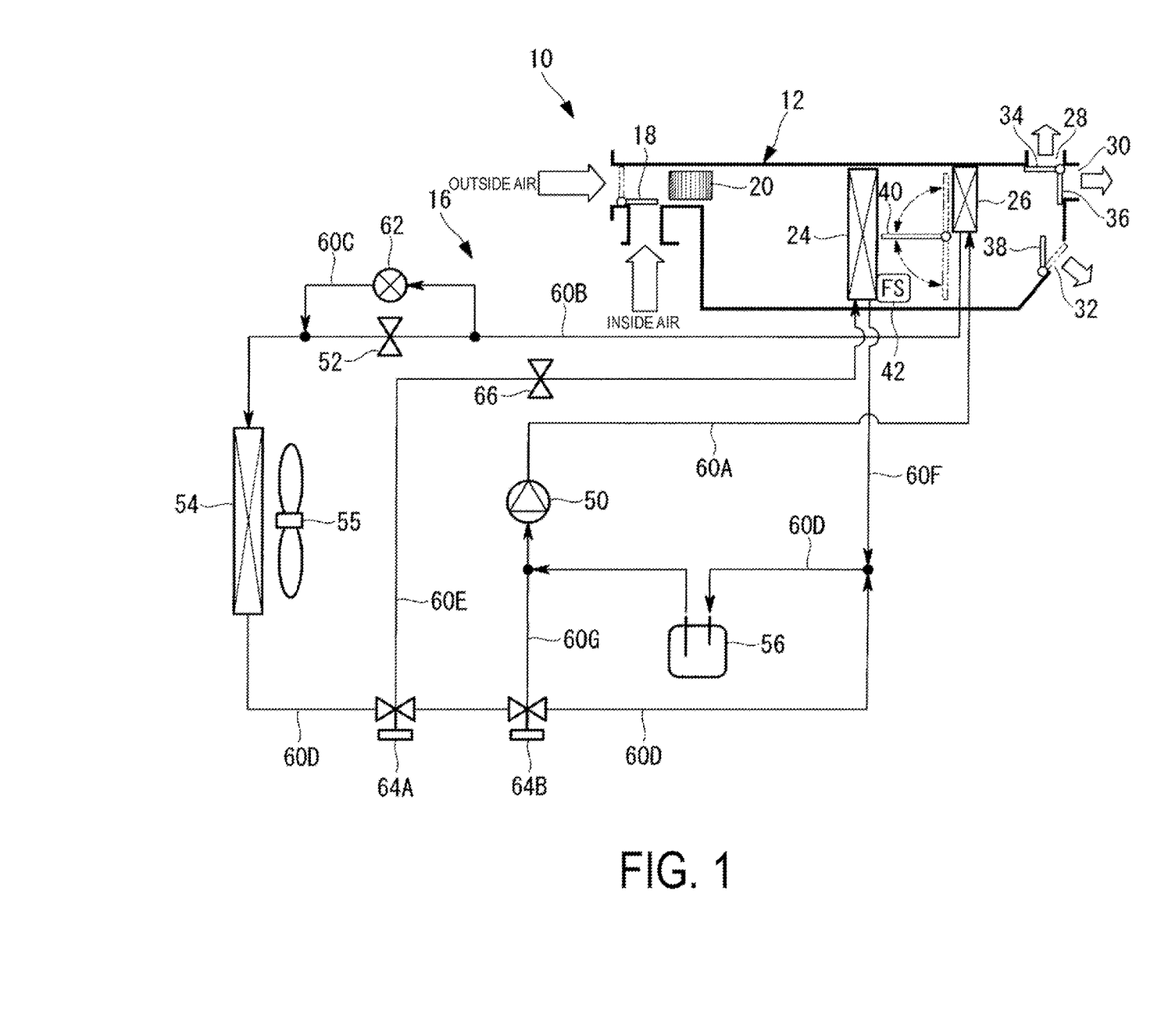
FIG. 1 is a refrigerant circuit diagram of a heat-pump-type vehicle air conditioning device according to an embodiment of the present invention.

FIG. 1 is a refrigerant circuit diagram of a vehicle air conditioning device 10 according to an embodiment of the present invention.

The vehicle air conditioning device 10 according to the present embodiment is provided with a HVAC unit (heating, ventilation, and air conditioning unit) 12, and a heat pump cycle 16 able to perform heating and cooling.

The HVAC unit 12 is provided with: a blower 20 that switches between allowing inside air from the vehicle cabin interior and outside air from the vehicle cabin exterior to be introduced via an inside/outside air switching damper 18 and feeds the air downstream; and a vehicle-cabin-interior evaporator 24 and a vehicle-cabin-interior condenser 26 sequentially disposed from the upstream side to the downstream side of the air flow path following from the blower 20. The HVAC unit 12 is typically installed in an instrument panel in the vehicle cabin and is configured to blow inside the vehicle cabin air temperature-controlled by the vehicle-cabin-interior evaporator 24 and the vehicle-cabin-interior condenser 26 from any one of a plurality of defroster air vents 28, face air vents 30, and foot air vents 32 (the air vents opening to the vehicle cabin interior) via corresponding blow out mode switching dampers 34, 36, 38 according to a selectively switchable blow out mode to condition the air inside the vehicle cabin to the set temperature. Also, an air mix damper 40 is disposed in a freely rotatable manner between the vehicle-cabin-interior evaporator 24 and the vehicle-cabin-interior condenser 26 so as to be able to control the amount of air flowing to the vehicle-cabin-interior condenser 26. The HVAC unit 12 is also provided with a blow out air temperature sensor (FS) 42.

A heat pump cycle 16 capable of cooling and heating is provided with a cycle for heating in which an electric compressor 50 that compresses the refrigerant, the vehicle-cabin-interior condenser 26, a throttle 52 (expansion valve), and a vehicle-cabin-exterior heat exchanger 54 are connected in the stated order via refrigerant piping 60. Note that an accumulator 56 is connected between the vehicle-cabin-exterior heat exchanger 54 and the electric compressor 50.

Specifically, a refrigerant pipe 60A connected to the refrigerant outlet of the electric compressor 50 is connected to the vehicle-cabin-interior condenser 26. Also the vehicle-cabin-interior condenser 26 is connected to the vehicle-cabin-exterior heat exchanger 54 by a refrigerant pipe 60B via the throttle 52. The refrigerant pipe 60B is provided with a bypass pipe 60C that bypasses the throttle 52. The bypass pipe 60C is provided with a switch valve 62. In the present embodiment, a fixed throttle such as a capillary tube can be employed as the throttle 52. However, the throttle 52 is not limited thereto and a temperature-driven automatic expansion valve, and the like may be employed.

The vehicle-cabin-exterior heat exchanger 54 is connected to the refrigerant inlet of electric compressor 50 by a refrigerant pipe 60D via the accumulator 56. The refrigerant flowing through the vehicle-cabin-exterior heat exchanger 54 exchanges heat with the outside air blown by a vehicle-cabin-exterior fan 55.

In order from the vehicle-cabin-exterior heat exchanger 54 side, a three way switch valve 64A and a three way switch valve 64B are disposed on the refrigerant pipe 60D which connects the vehicle-cabin-exterior heat exchanger 54 and the accumulator 56. The three way switch valves 64A, 64B can be replaced with a combination of two solenoid valves, for example.

A refrigerant pipe 60E is connected to the three way switch valve 64A, and the vehicle-cabin-interior evaporator 24 is connected to the refrigerant pipe 60E via a throttle 66. The vehicle-cabin-interior evaporator 24 is connected to the accumulator 56 via a refrigerant pipe 60F.

In the present embodiment, in a manner similar to that of the throttle 52, a fixed throttle valve such as a capillary tube can be employed as the throttle 66. However, the throttle 66 is not limited thereto and a temperature-driven automatic expansion valve, and the like may be employed.

Also, a bypass pipe 60G is connected to the three way switch valve 64B, and the bypass pipe 60G is connected to the refrigerant inlet of the electric compressor 50. Specifically, the bypass pipe 60G connects the vehicle-cabin-exterior heat exchanger 54 to the electric compressor 50 bypassing the accumulator 56.

The refrigerating cycle for heating of the heat pump cycle 16 described above has a configuration in which the switch valve 62 is closed, the refrigerant flows through the three way switch valve 64A, and the vehicle-cabin-exterior heat exchanger 54 and the electric compressor 50 are connected by the three way switch valve 64B via the accumulator 56.

On the other hand, the refrigerating cycle for cooling has a configuration in which the switch valve 62 is open and the vehicle-cabin-exterior heat exchanger 54 and the vehicle-cabin-interior evaporator 24 are connected by the three way switch valve 64A.

Figure 2:
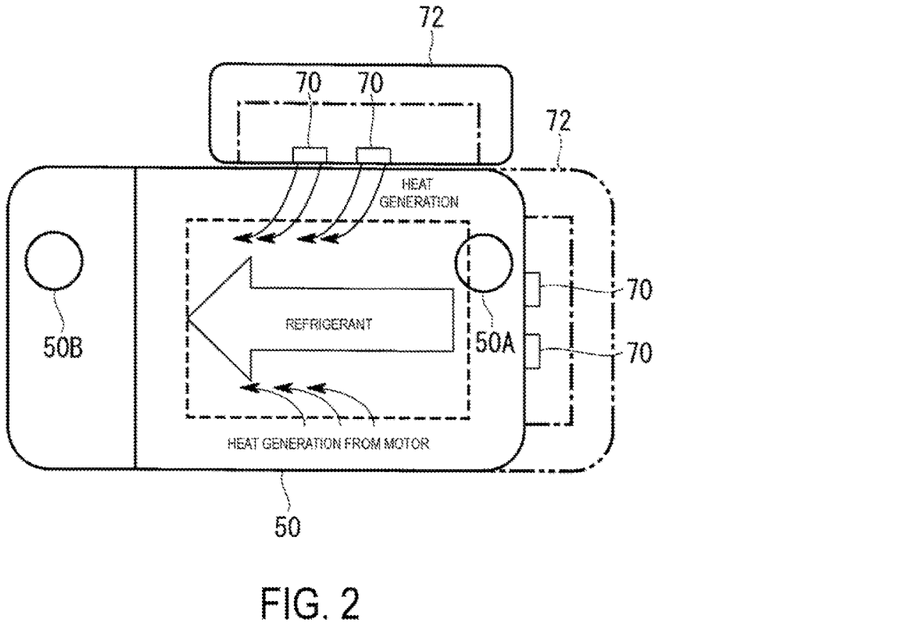
FIG. 2 is a schematic configuration diagram illustrating an electric compressor according to an embodiment of the present embodiment.

FIG. 2 is a schematic configuration diagram illustrating the electric compressor 50 according to the present embodiment.

In the electric compressor 50, an inverter 72 using a power element 70 constituted by a semiconductor device having high thermal resistance, which is, for example, an insulated gate bipolar transistor (IGBT), is disposed. Specifically, the electric compressor 50 is formed integrally with the inverter 72.

The semiconductor device having high thermal resistance constituting the power element 70 is a semiconductor device having thermal resistance higher than that of conventional semiconductor devices formed from Si and the like. Also, the semiconductor device having high thermal resistance is preferably able to withstand the rise in temperature of the refrigerant, as is described below.

The semiconductor device having high thermal resistance may be a semiconductor device formed from SiC for example. However, the semiconductor device is not limited thereto and may be, for example, a semiconductor device formed from gallium nitride or a diamond.

The inverter 72 is disposed on the electric compressor 50 so that the refrigerant compressed by the electric compressor 50 can be heated by the power element 70. Specifically, the refrigerant is heated by the heat generated by the power element 70 and the heat generated by the motor of the electric compressor 50, while the refrigerant is flowing from the refrigerant inlet 50A to the refrigerant outlet 50B of the electric compressor 50.

By the power element 70 being constituted by a semiconductor device having high thermal resistance, the power element 70 can heat the refrigerant with the very heat generated by the semiconductor device having high thermal resistance. Specifically, the vehicle air conditioning device 10 utilizes the power element 70 used in the inverter 72 constituted by a semiconductor device having high thermal resistance as a heat source for heating the refrigerant upon heating operations of the heat pump cycle 16.

Note that the position where the inverter 72 is disposed is dependent upon the design of the vehicle. However, the inverter 72 is preferably disposed on the side surface (see the solid line of FIG. 2) of the electric compressor 50 or approximate to the refrigerant inlet 50A on the back (see the broken line of FIG. 2) of the electric compressor 50.

Also, by using the semiconductor device having high thermal resistance as the power element 70, the reliability of the electric compressor 50, as well as the vehicle air conditioning device 10 can be increased.

Figure 3:
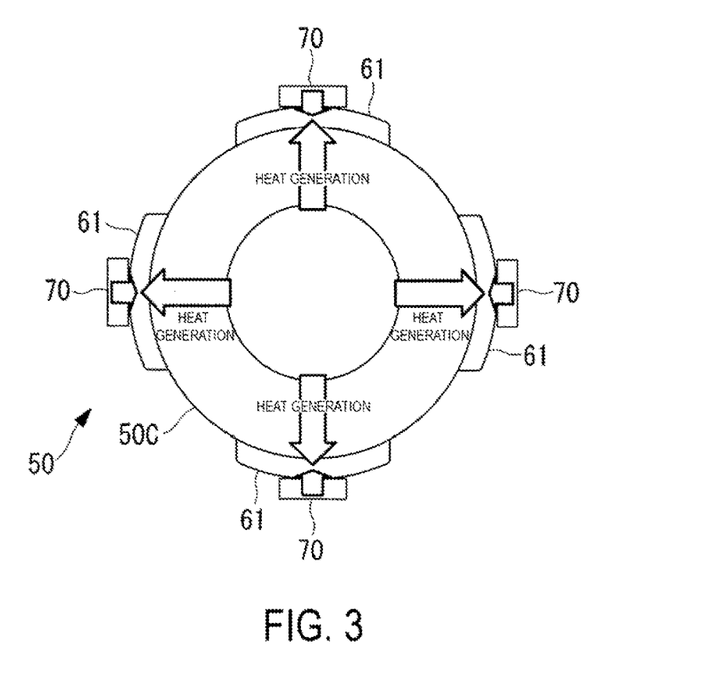
FIG. 3 is a schematic cross-sectional view illustrating the electric compressor according to an embodiment of the present embodiment.

FIG. 3 is a schematic cross-sectional view illustrating the electric compressor 50 according to the present embodiment.

As illustrated in FIG. 3, refrigerant flow paths 61 connected to the refrigerant pipe 60A and the bypass pipe 60G are disposed in contact with the surface of the motor 50C of the electric compressor 50, and the power elements 70 are disposed in contact with the refrigerant flow paths 61. Consequently, the refrigerant flowing through the refrigerant flow paths 61 is heated by the power elements 70 and the motor 50C. Also, by this process, the power elements 70 and the motor 50C are cooled by the refrigerant.

Here, "in contact" means any kind of contact including direct contact or indirect contact. Also, the number and position of the power elements 70 disposed on the refrigerant flow path 61 are not limited, and the power element 70 may be disposed at 4 positions as illustrated in FIG. 3, or at a single position.

Figure 4:
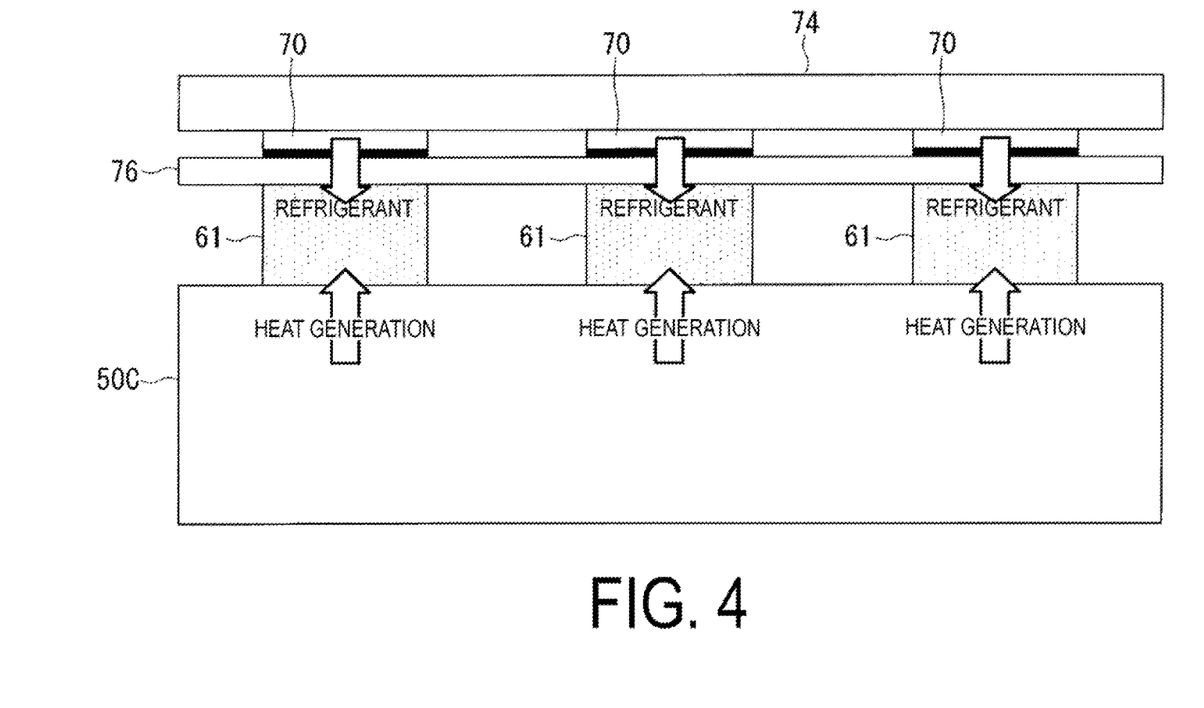
FIG. 4 is a detailed cross-sectional view illustrating positions at which the power elements are disposed on the electric compressor according to an embodiment of the present invention.

FIG. 4 is a detailed cross-sectional view illustrating positions at which the power element 70 may be disposed on the electric compressor 50.

As illustrated in FIG. 4, a control circuit board 74 is disposed on the top portion of the power elements 70.

The power element 70 is in contact with the refrigerant flow path 61 via a case 76 (for example, an aluminum case) for housing the power element 70 and the control circuit board 74.

The refrigerant flow path 61 may, for example, be divided into a plurality of paths aligned side by side in contact with the motor 50C. Also, the power elements 70 are disposed corresponding to each of the divided refrigerant flow paths 61. Note that the refrigerant flow path 61 may not branch into a plurality of paths. In other words, the refrigerant flow path 61 may come into contact with the motor 50C as a single path.

Also, to achieve a configuration in which the thermal conductivity from the power element 70 to the case 76 is increased, thermal grease, thermal conductive sheets, and the like may be appropriately disposed between the case 76 and the power element 70, between the case 76 and the refrigerant flow path 61, and between the refrigerant flow path 61 and the motor 50C.

Note that when a copper inlay circuit board or a heat dissipating circuit board is used as the control circuit board 74, the control circuit board 74 may be disposed on the bottom portion of the power element 70 in contact with the case 76. Specifically, the heat from the power element 70 is transferred to the refrigerant via the control circuit board 74 and the case 76.

Next, the flow of refrigerant upon operation of the above-described heat-pump-type vehicle air conditioning device 10 is described with reference to FIGS. 5 to 7. Note that in each of the drawings, the flow path of the refrigerant upon operation is indicated with a bold line.

Cooling Operation

Upon cooling operation, the switch valve 62 is controlled to be fully open, and the vehicle-cabin-exterior heat exchanger 54 and the vehicle-cabin-interior evaporator 24 are connected to each other by the three way switch valve 64A. Also, the air mix damper 40 is positioned so that air does not flow to the vehicle-cabin-interior condenser 26. Note that when the HVAC unit 12 needs to perform temperature control, the air mix damper 40 is appropriately opened and the temperature of the air blown into the vehicle cabin is controlled.

Figure 5:
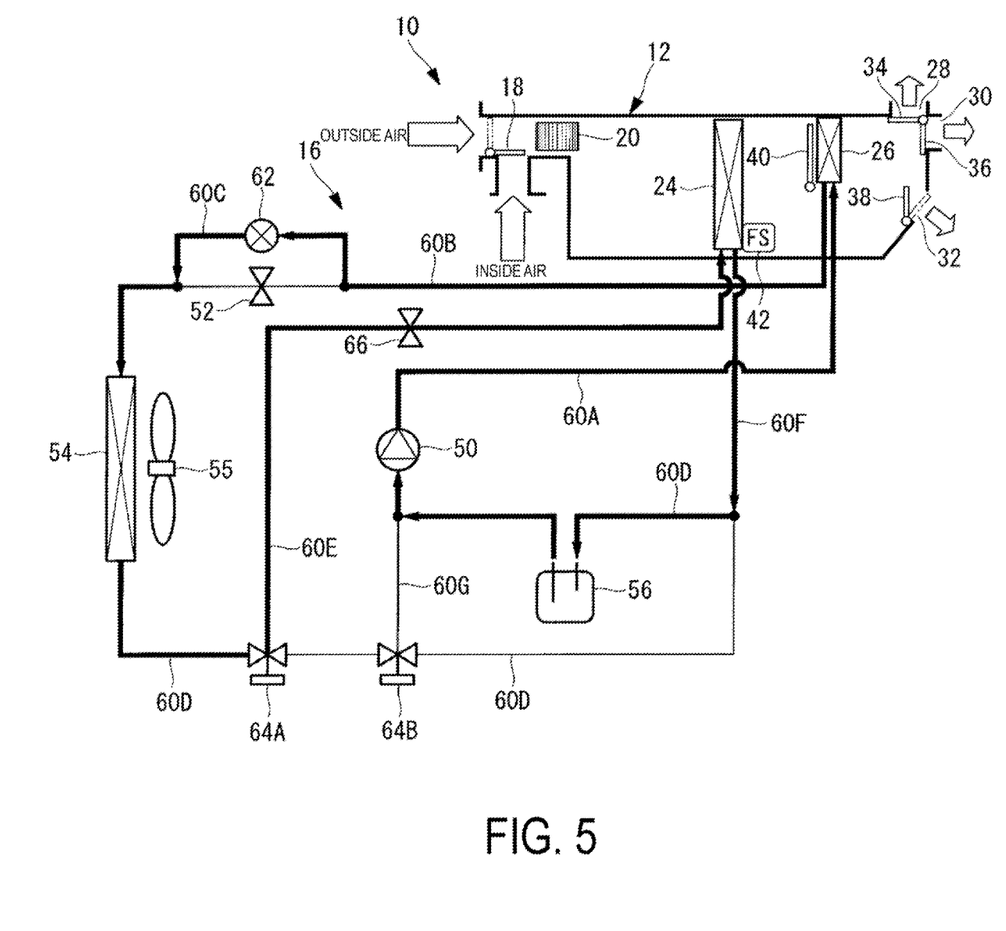
FIG. 5 is a refrigerant circuit diagram illustrating the flow of refrigerant upon cooling operation of the heat-pump-type vehicle air conditioning device according to an embodiment of the present invention.

Consequently, as illustrated in FIG. 5, the refrigerant compressed by the electric compressor 50 is supplied to the vehicle-cabin-exterior heat exchanger 54 via the vehicle-cabin-interior condenser 26, bypassing the throttle 52. Then, the refrigerant exchanges heat with the outside air blown by the vehicle-cabin-exterior fan 55 and undergoes condensation. Next, the refrigerant is decompressed at the throttle 66 and enters a gas-liquid two phase state, before being supplied to the vehicle-cabin-interior evaporator 24. At the vehicle-cabin-interior evaporator 24, the refrigerant exchanges heat with the inside air or a mix of the inside and outside air blown by the blower 20, and evaporates into a gas. The refrigerant is then supplied to the accumulator 56 and is retained temporarily, before being introduced into the electric compressor 50 and compressed again. Thereafter, the cycle repeats in a similar manner.

Also, the inside air or a mix of the inside and outside air cooled by exchanging heat with the refrigerant at the vehicle-cabin-interior evaporator 24 is blown inside the vehicle cabin from any one of the defroster air vent 28, the face air vent 30, or the foot air vent 32 via corresponding blow out mode switching dampers 34, 36, 38 according to the switchable blow out mode, providing cooling for the vehicle cabin interior.

Normal Heating Operation

Upon normal heating operation, the switch valve 62 is controlled to be fully closed, and the vehicle-cabin-exterior heat exchanger 54 and the electric compressor 50 are connected via the accumulator 56 by the three way switch valves 64A, 64B. Also, the air mix damper 40 is positioned so that air flows to the vehicle-cabin-interior condenser 26.

Figure 6:
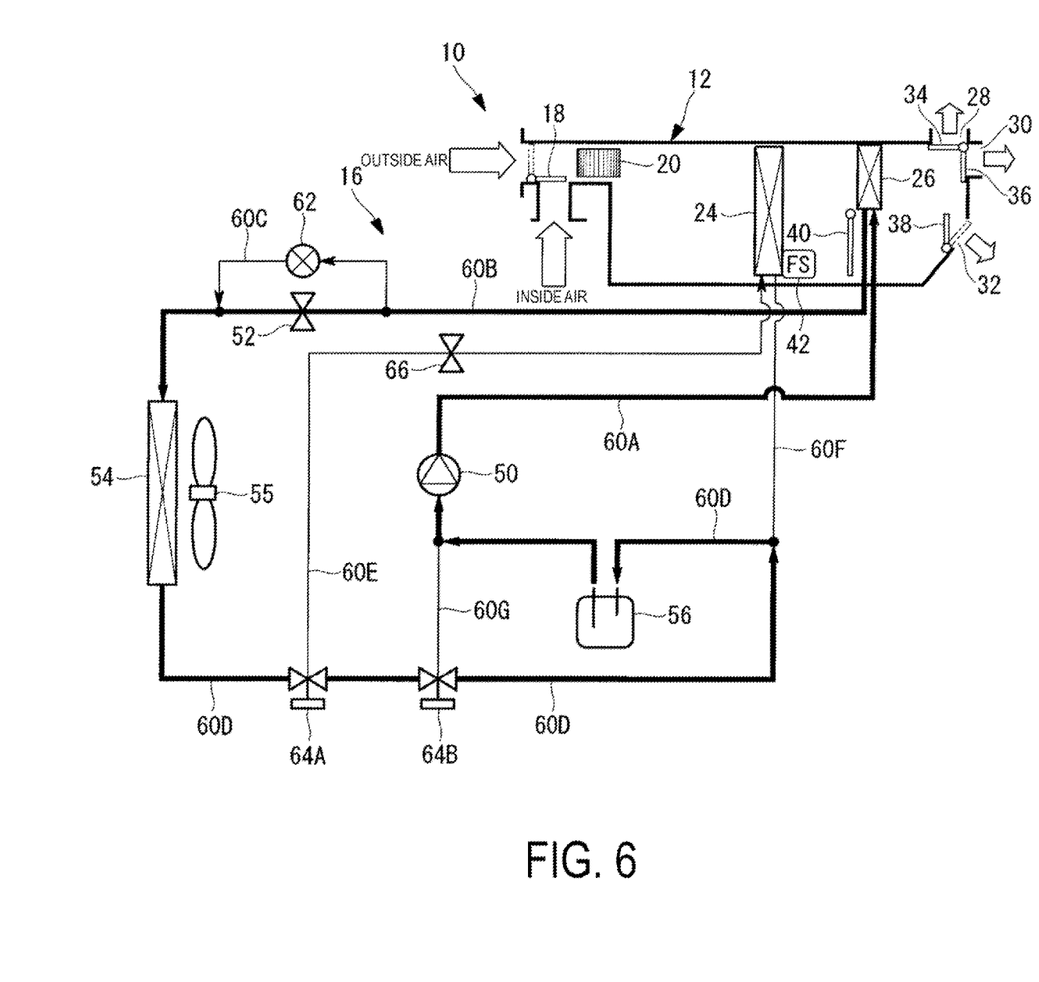
FIG. 6 is a refrigerant circuit diagram illustrating the flow of refrigerant upon heating operation of the heat-pump-type vehicle air conditioning device according to an embodiment of the present invention.

Consequently, as illustrated in FIG. 6, the refrigerant compressed by the electric compressor 50 is supplied to the vehicle-cabin-interior condenser 26 from the refrigerant pipe 60A. The refrigerant then exchanges heat with the inside air or a mix of the inside and outside air blown from the blower 20, and loses heat at the vehicle-cabin-interior condenser 26. The resulting heated air is then blown inside the vehicle cabin from any one of the defroster air vent 28, the face air vent 30, or the foot air vent 32 according to the blow out mode, providing heating for the vehicle cabin interior.

The refrigerant which lost heat and underwent condensation at the vehicle-cabin-interior condenser 26 is supplied to the throttle 52, where the refrigerant is decompressed and enters a gas-liquid two phase state, before being supplied to the vehicle-cabin-exterior heat exchanger 54. The refrigerant then exchanges heat with the outside air blown by the vehicle-cabin-exterior fan 55 to become a two phase evaporated gas. Next, the refrigerant is supplied to the refrigerant inlet of the electric compressor 50 via the accumulator 56 and is compressed again. Thereafter, the cycle repeats in a similar manner.

Heating Operation Using a Power Element Heat Source

Heating operation using a power element heat source uses the power element 70 as a heat source to heat the refrigerant by the heat generated by the power element 70. Heating operation using a power element heat source may be performed when, for example, outside air temperature drops to a temperature at which frost needs to be removed from the vehicle-cabin-exterior heat exchanger 54.

Figure 7:
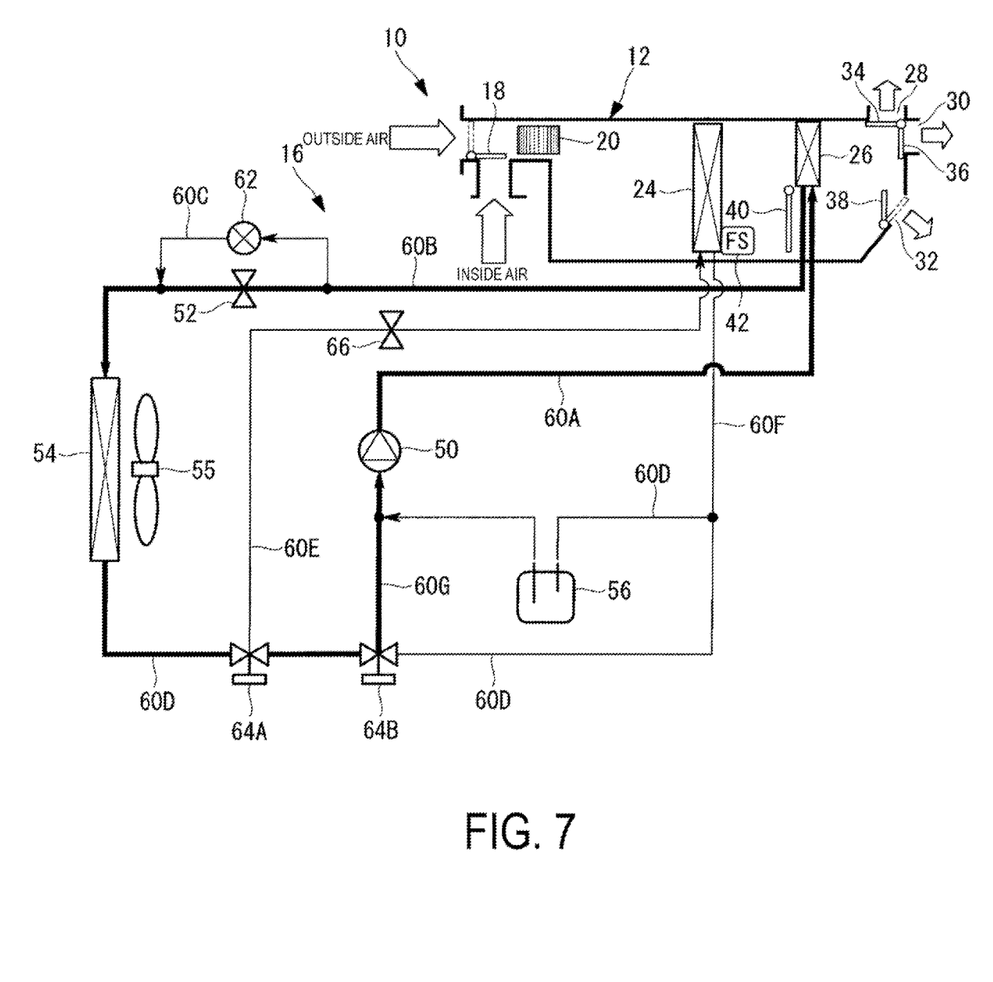
FIG. 7 is a refrigerant circuit diagram illustrating the flow of refrigerant upon heating operation using a power element heat source of the heat-pump-type vehicle air conditioning device according to an embodiment of the present invention.

Heating operation using a power element heat source, as illustrated in FIG. 7, is performed in a manner similar to that of normal operation except that the refrigerant is supplied to the electric compressor 50 from the vehicle-cabin-exterior heat exchanger 54 via the three way switch valve 64B, bypassing the accumulator 56.

Consequently, the refrigerant does not go through the accumulator 56 and is supplied to the electric compressor 50 in a two-phase state rich in liquid. The refrigerant is rich in liquid due to the low outside air temperature causing the refrigerant to be unable to draw in sufficient heat at the vehicle-cabin-exterior heat exchanger 54, and, as a result, undergo insufficient evaporation. The refrigerant has a higher heat transfer coefficient in a liquid-rich state than a gaseous state. Consequently, a liquid-rich refrigerant can efficiently draw in heat generated by the power element 70.

Also, when using the power element 70 to heat the refrigerant, the efficiency of the power element 70 is decreased compared to when the power element is not used to heat the refrigerant.

When the efficiency of the power element 70 decreases, the amount of heat generated by the power element 70 increases. Consequently, the power element 70 can better heat the refrigerant.

As described above, the vehicle air conditioning device 10 according to the present embodiment is provided with the heat pump cycle 16 for heating in which the electric compressor 50 that compresses the refrigerant, the vehicle-cabin-interior condenser 26, the throttle 52, and the vehicle-cabin-exterior heat exchanger 54 are connected in the stated order via the refrigerant piping 60. Also, the inverter 72 for the electric compressor 50, which uses the power element 70 constituted by a semiconductor device having high thermal resistance, is disposed on the electric compressor 50 so that the refrigerant compressed by the electric compressor 50 is able to be heated by the power element 70, and the power element 70 heats the refrigerant upon heating operation of the heat pump cycle 16.

Accordingly, the vehicle air conditioning device 10 whereby weight and cost increase can be suppressed and the refrigerant heating performance can be improved is achieved.

Modified Example

Figure 8:
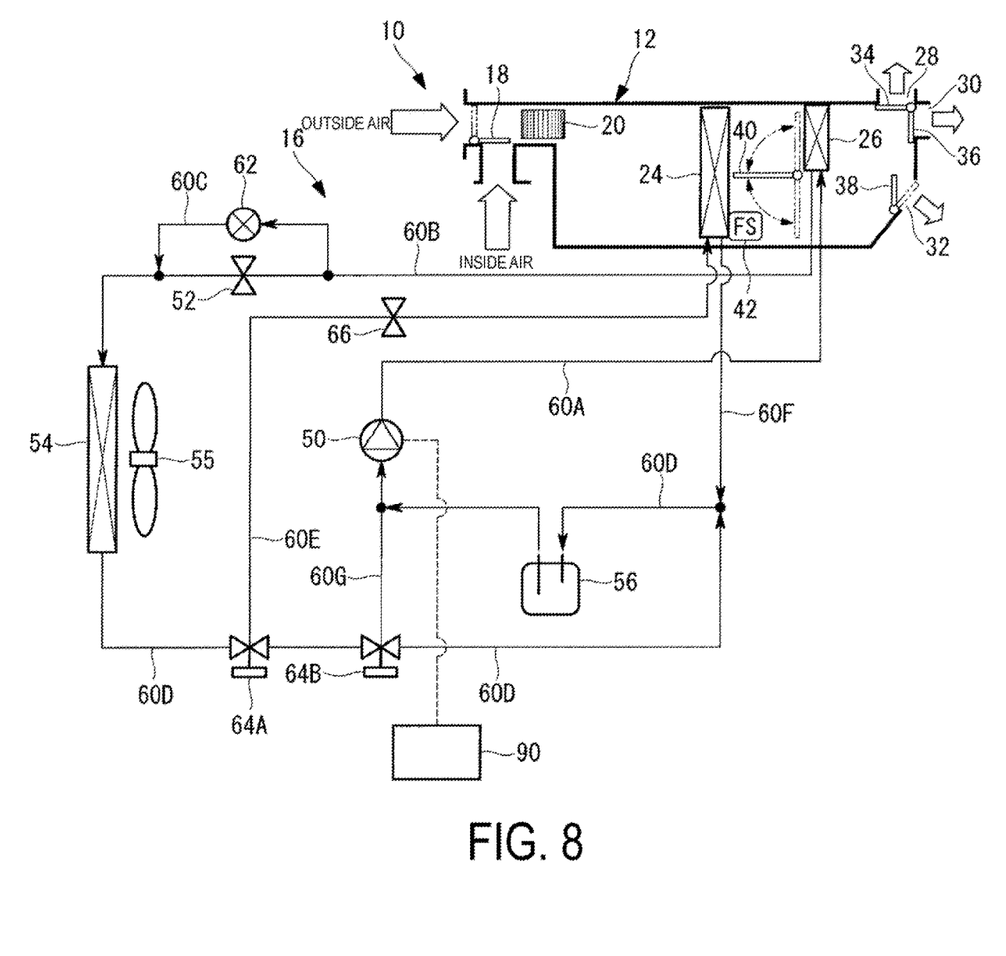
FIG. 8 is a refrigerant circuit diagram of a heat-pump-type vehicle air conditioning device according to a modified example of the present invention.

FIG. 8 is a view illustrating the configuration according to a modified example of the vehicle air conditioning device 10. Note that components in FIG. 8 that are the same as components in FIG. 1 are given the same reference numeral, and the description thereof is omitted.

In the present modified example, the electric compressor 50, on which the inverter 72 is disposed, is operable on power from a power source 90 outside of the vehicle (hereinafter, outside power source). At times, such as when the vehicle is charging, when the vehicle and the outside power source 90 are connected, the electric compressor 50 operates powered by the outside power source 90.

Also, when the vehicle and the outside power source 90 are connected, the electric compressor 50 is wirelessly controllable via a portable electronic device, and the like. Operation of the electric compressor 50 is also possible to be executed via the setting of a timer.

As a result of this configuration, the vehicle cabin interior can be heated prior to a person entering the vehicle on cold mornings, and the like, by operating the electric compressor 50 in advance, thus increasing the comfort level of the person in the vehicle.

The present invention has been described using the embodiments described above. However, the technical scope of the present invention is not limited to the scope of the description of the embodiments described above. Various changes and enhancements preserving the spirit of the invention can be made to the embodiments described above, and the configurations including such changes and enhancements are included in the technical scope of the present invention.

For example, in the embodiments described above, a configuration in which, when the power element 70 is used as a heat source, the refrigerant is supplied to the electric compressor 50 from the vehicle-cabin-exterior heat exchanger 54 bypassing the accumulator 56 was described. However, the present invention is not limited thereto. When the power element 70 is used as a heat source, the refrigerant may be supplied to the electric compressor 50 from the vehicle-cabin-exterior heat exchanger 54 without bypassing the accumulator 56.

REFERENCE SIGNS LIST

10 Vehicle air conditioning device
16 Heat pump cycle
26 Vehicle-cabin-interior condenser
50 Electric compressor
52 Throttle
54 Vehicle-cabin-exterior heat exchanger
56 Accumulator
60 Refrigerant piping
60G Bypass pipe
70 Power element
72 Inverter

The invention claimed is:

1. A vehicle air conditioning device comprising:
a heat pump cycle for heating in which an electric compressor that compresses a refrigerant, a vehicle-cabin-interior condenser, a throttle, and a vehicle-cabin-exterior heat exchanger are connected in the stated order via refrigerant piping;
an inverter for the electric compressor using a power element constituted by a semiconductor device having high thermal resistance;
an accumulator connected between the vehicle-cabin-exterior heat exchanger and the electric compressor; and
a bypass pipe that connects the vehicle-cabin-exterior heat exchanger and the electric compressor bypassing the accumulator;
the inverter being disposed on the electric compressor so that the refrigerant compressed by the electric compressor is able to be heated by the power element, and the power element heating the refrigerant upon heating operation of the heat pump cycle, wherein
the refrigerant does not go through the accumulator and is supplied to the electric compressor from the vehicle-cabin-exterior heat exchanger via the bypass pipe, upon the power element heating the refrigerant.

2. The vehicle air conditioning device according to claim 1, wherein upon using the power element to heat the refrigerant, the efficiency of the power element is decreased compared to when the power element is not used to heat the refrigerant.

3. The vehicle air conditioning device according to claim 1, wherein the electric compressor is operable on power from a power source outside of the vehicle.

4. The vehicle air conditioning device according to claim 2, wherein the electric compressor is operable on power from a power source outside of the vehicle.

5. An electric compressor used in a vehicle air conditioning device, the electric compressor being connected to a vehicle-cabin-exterior heat exchanger via an accumulator, and the electric compressor being connected to a bypass pipe that connects the vehicle-cabin-exterior heat exchanger bypassing the accumulator, the electric compressor comprising:
an inverter that uses a power element constituted by a semiconductor device having high thermal resistance;
the power element being disposed so that a compressed refrigerant is able to be heated thereby, wherein
the refrigerant does not go through the accumulator and is supplied to the electric compressor from the vehicle-cabin-exterior heat exchanger via the bypass pipe, upon the power element heating the refrigerant.

6. A method of air conditioning a vehicle using a heat pump cycle for heating in which an electric compressor that compressed a refrigerant, a vehicle-cabin-interior condenser, a throttle, and a vehicle-cabin-exterior heat exchanger are connected in the stated order via refrigerant piping, the heat pump cycle comprising an accumulator connected between the vehicle-cabin-exterior heat exchanger and the electric compressor, and the heat pump cycle comprising a bypass pipe that connects the vehicle-cabin-exterior heat exchanger and the electric compressor bypassing the accumulator, the method comprising the step of:
heating the refrigerant with a power element constituted by a semiconductor device having high thermal resistance upon heating operation of the heat pump cycle, an inverter for the electric compressor using the power element being disposed on the electric compressor so that the refrigerant compressed by the compressor can be heated by the power element, wherein
the refrigerant does not go through the accumulator and is supplied to the electric compressor from the vehicle-cabin-exterior heat exchanger via the bypass pipe, upon the power element heating the refrigerant.

* * * * *